United States Patent
Robinson et al.

(10) Patent No.: US 11,967,237 B2
(45) Date of Patent: Apr. 23, 2024

(54) BLIND SPOT WARNING METHOD AND SYSTEM FOR A MOTOR VEHICLE HAVING A TRAILER COUPLED THERETO

(71) Applicant: Continental Advanced Lidar Solutions US, LLC, Carpinteria, CA (US)

(72) Inventors: Andrew Boyd Robinson, Northville, MI (US); Max Vancil, Clarkston, MI (US); Oleg Ostrovskiy, Auburn Hills, MI (US)

(*) Notice: Subject to any disclaimer, the term of this patent is extended or adjusted under 35 U.S.C. 154(b) by 0 days.

(21) Appl. No.: 17/650,568

(22) Filed: Feb. 10, 2022

(65) Prior Publication Data
US 2023/0211734 A1 Jul. 6, 2023

Related U.S. Application Data

(60) Provisional application No. 63/266,286, filed on Dec. 31, 2021.

(51) Int. Cl.
*G08G 1/16* (2006.01)
*B60R 1/12* (2006.01)
*B60R 1/25* (2022.01)

(52) U.S. Cl.
CPC ........... *G08G 1/167* (2013.01); *B60R 1/12* (2013.01); *B60R 1/25* (2022.01); *B60R 2001/1215* (2013.01); *B60R 2300/30* (2013.01); *B60R 2300/802* (2013.01)

(58) Field of Classification Search
CPC ........ G08B 21/00; G05D 1/00; G05D 1/0061; E05C 17/00; E05C 17/02; B60D 1/00; B60D 1/30; B60Q 1/00; B60Q 1/30; B60Q 9/00; B60R 1/00; B60W 10/04; B60W 10/20; B60W 20/10; H04W 4/46
See application file for complete search history.

(56) References Cited

U.S. PATENT DOCUMENTS 9,211,889 B1 12/2015 Hoetzer et al.
9,493,117 B2 11/2016 Shehan
9,594,155 B2 3/2017 Cashler
(Continued)

FOREIGN PATENT DOCUMENTS

WO 2016015938 A1 2/2016
WO 2017138866 A2 8/2017
WO 2018091675 A1 5/2018

OTHER PUBLICATIONS

NPL Search (Mar. 4, 2023).*
(Continued)

*Primary Examiner* — Van T Trieu

(57) ABSTRACT

A blind spot warning method is disclosed for a tow vehicle. The method includes determining whether a trailer is connected to the tow vehicle. Based on the determination whether the trailer is connected to the tow vehicle, the determines whether a blind spot zone corresponds to the tow vehicle or to the tow vehicle and the trailer. At least one instruction is sent to a user interface of the tow vehicle for displaying an image for viewing by a driver of the tow vehicle. The displayed image indicates the determination whether the blind spot zone corresponds to the tow vehicle or to the tow vehicle and the trailer, and indicates a presence or absence of at least one other vehicle disposed in the blind spot zone.

16 Claims, 7 Drawing Sheets

(56) References Cited

U.S. PATENT DOCUMENTS

| | | | | |
|---|---|---|---|---|
| 10,857,935 | B1* | 12/2020 | Alter | B60Q 1/50 |
| 10,902,728 | B2* | 1/2021 | Ferrer | B60W 10/18 |
| 11,017,672 | B2 | 5/2021 | Kim | |
| 11,176,827 | B2* | 11/2021 | Schondorf | B60R 11/04 |
| 2016/0041258 | A1 | 2/2016 | Cashler et al. | |
| 2018/0356527 | A1 | 12/2018 | Kozak et al. | |
| 2019/0179010 | A1 | 6/2019 | Nasser et al. | |
| 2019/0210418 | A1* | 7/2019 | Hall | B60D 1/245 |
| 2020/0215985 | A1* | 7/2020 | Lynam | B60R 1/0602 |
| 2020/0372802 | A1 | 11/2020 | Kim | |

OTHER PUBLICATIONS

International Search Report and Written Opinion, the International Searching Authority, for counterpart PCT application PCT/US2022/082211, Apr. 25, 2023.

* cited by examiner

BLIND SPOT WARNING METHOD AND SYSTEM FOR A MOTOR VEHICLE HAVING A TRAILER COUPLED THERETO

CROSS REFERENCE TO RELATED APPLICATION

The present application claims the benefit of U.S. provisional application 63/266,286, filed Dec. 31, 2021, entitled "Blind Spot Warning Method and System for a Motor Vehicle Having a Trailer Coupled Thereto," the content of which is hereby incorporated by reference herein in its entirety.

TECHNICAL FIELD

This disclosure relates to a blind spot warning method and system for a tow vehicle having a connected trailer, and particularly relates to a system which informs a user of a tow vehicle of a size of a corresponding blind spot zone based upon whether or not a trailer is connected to the tow vehicle.

BACKGROUND

Some vehicles today include autonomous and/or semi-autonomous functionality for vehicles for use in connecting to a trailer and pulling the connected trailer. One such function is a blind spot warning system in which sensors disposed on the tow vehicle sense another vehicle is disposed in proximity to the vehicle. Oftentimes a trailer is connected to the vehicle, in which case the blind spot warning system of the tow vehicle extends the blind spot zone to correspond not only to the tow vehicle but also the trailer. However, the tow vehicle driver may be unsure as to which blind spot zone, the zone corresponding to the tow vehicle or corresponding to the tow vehicle and the trailer, is used by the blind spot warning system.

SUMMARY

Example embodiments of the present disclosure are directed to a blind spot warning method for a tow vehicle, including determining, at data processing hardware, whether a trailer is connected to the tow vehicle. The data processing hardware determines, based on the determination whether the trailer is connected to the tow vehicle, whether a blind spot zone corresponds to the tow vehicle or to the tow vehicle and the trailer. At least one instruction is sent from the data processing hardware to a user interface of the tow vehicle. The at least one instruction is an instruction for displaying an image for viewing by a driver of the tow vehicle. The displayed image indicates the determination whether the blind spot zone corresponds to the tow vehicle or to the tow vehicle and the trailer, and indicates a presence or absence of another vehicle in the blind spot zone.

In an implementation, displaying the image includes displaying the image on at least one mirror of the tow vehicle and/or on another display of the tow vehicle.

In an implementation, the displayed image includes a representation of the tow vehicle, a representation of the trailer, and at least one of a representation of a first other vehicle disposed adjacent the representation of the tow vehicle or a representation of a second other vehicle disposed adjacent the representation of the trailer.

The blind spot warning method may further include detecting the another vehicle in the blind spot zone. If the trailer is determined to be connected to the tow vehicle, the method may further include sending at least one second instruction from the data processing hardware to the user interface to change in the displayed image the representation of the tow vehicle, the representation of the trailer and the representation of the second other vehicle. The sending may be responsive to the detection of the another vehicle in the blind spot zone.

The method may further include, if the trailer is determined not to be connected to the tow vehicle, sending at least one third instruction from the data processing hardware to the user interface to change in the displayed image the representation of the tow vehicle and the representation of the first other vehicle, with the sending being responsive to the detection of the another vehicle in the blind spot zone.

In an implementation, the at least one second instruction to change the representation of the tow vehicle, the representation of the trailer, and the representation of the second other vehicle in the displayed image is to change the representation of the tow vehicle, the representation of the trailer, and the representation of the second other vehicle from a first color to a second color. In addition, the at least one third instruction to change the representation of the tow vehicle and the trailer and the representation of the first other vehicle in the displayed image is to change the representation of the tow vehicle and the representation of the first other vehicle from the first color to the second color without changing a color of the representation of the trailer. In one aspect, the second color is red.

In an implementation, the method includes receiving, at the data processing hardware, information associated with one or more dimensions of the trailer, and determining, at the data processing hardware, a length of the blind spot zone based at least partly upon the information. In this case, if the trailer is determined to be connected to the tow vehicle, detecting the another vehicle in the blind spot zone is based upon the length of the blind spot zone. The information associated with the one or more dimensions of the trailer is provided from memory accessible by the data processing hardware or via the user interface of the tow vehicle.

In an implementation, the determination whether the blind spot zone corresponds to the tow vehicle or to the tow vehicle and the trailer is constantly provided in the displayed image during operation of the tow vehicle.

Another example embodiment is directed to a blind spot warning software product stored in non-transitory memory and having instructions which, when executed by data processing hardware, causes the data processing hardware to perform a method described above, including determining whether a trailer is connected to the tow vehicle and determining, based on the determination whether the trailer is connected to the tow vehicle, whether a blind spot zone corresponds to the tow vehicle or to the tow vehicle and the trailer. At least one instruction is sent to a user interface of the tow vehicle, for displaying an image for viewing by a driver of the tow vehicle. The displayed image indicates the determination whether the blind spot zone corresponds to the tow vehicle or to the tow vehicle and the trailer, and indicates a presence or absence of another vehicle in the blind spot zone.

In another example embodiment, a blind spot warning system for a tow vehicle is disclosed, including a controller having data processing hardware and memory. The controller is configured to perform a method as described above and including actions to determine whether a trailer is connected to the tow vehicle. Based on the determination whether the trailer is connected to the tow vehicle, the controller determines whether a blind spot zone corresponds to the tow vehicle or to the tow vehicle and the trailer. In addition, the controller is configured to send, to a user interface of the tow vehicle, at least one instruction for displaying an image for viewing by a driver of the tow vehicle. The displayed image indicates the determination whether the blind spot zone corresponds to the tow vehicle or to the tow vehicle and the trailer, and indicates a presence or absence of another vehicle disposed in the blind spot zone.

BRIEF DESCRIPTION OF THE DRAWINGS

The present disclosure will become more fully understood from the detailed description and the accompanying drawings, wherein.

DESCRIPTION

Figure 1:
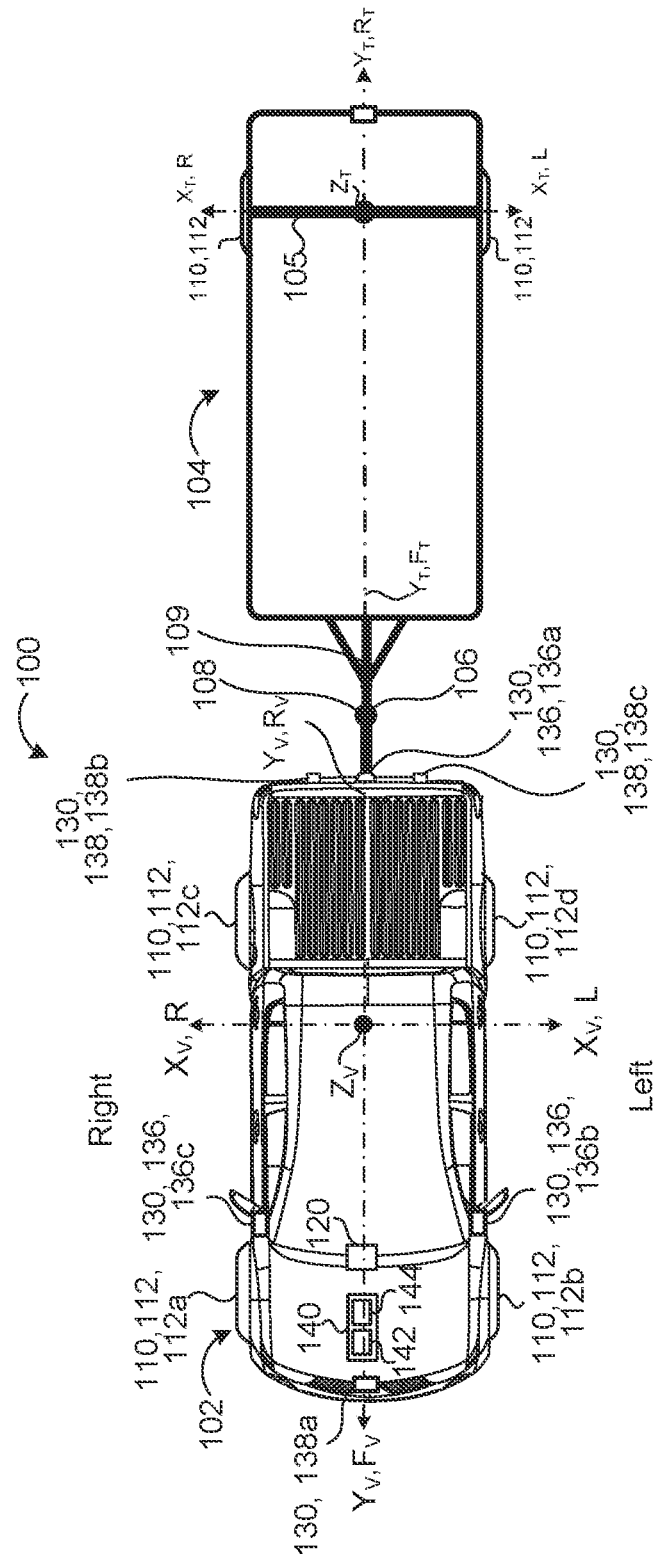
FIG. 1 is a schematic diagram of a tow vehicle hitched to a trailer, according to an example embodiment.

The following description is merely exemplary in nature and is in no way intended to limit the disclosure, its application, or uses. For purposes of clarity, the same reference numbers will be used in the drawings to identify similar elements.

In general terms, example embodiments are directed to a blind spot warning system and method for a tow vehicle which indicates to the tow vehicle driver the presence or absence of another vehicle in an adjacent blind spot area, and indicates a blind spot zone as corresponding to the tow vehicle or to the tow vehicle and a connected trailer.

Figure 2:
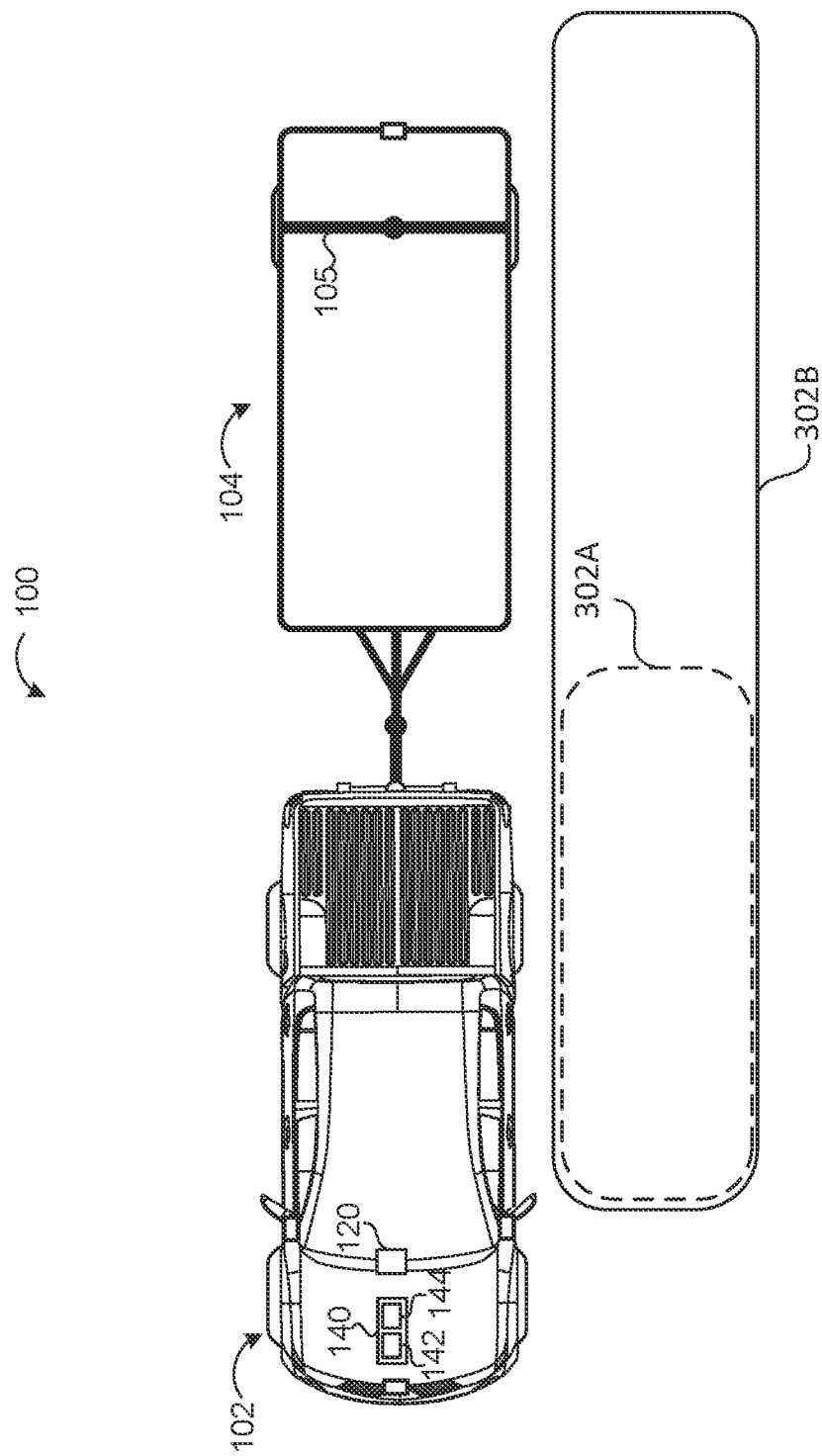
FIG. 2 is a diagram of the tow vehicle and trailer of FIG. 1 and includes blind spot zones corresponding to the tow vehicle and corresponding to the trailer.
Figure 3:
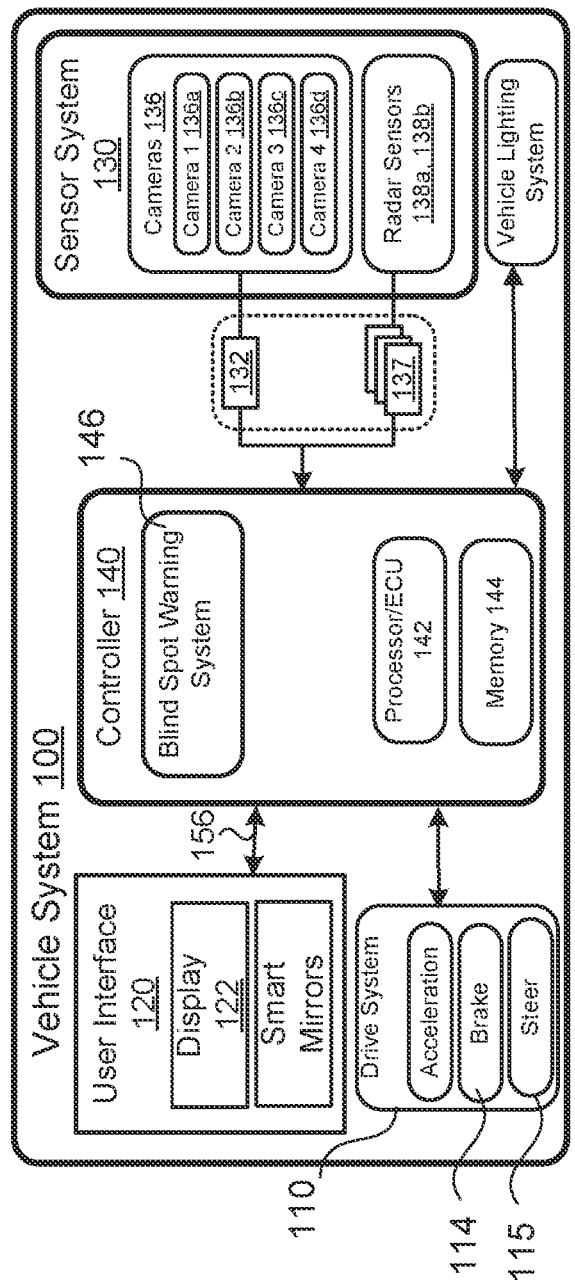
FIG. 3 is a block diagram of a vehicle system of the tow vehicle of FIG. 1 having a blind spot warning system, according to an example embodiment.

Referring to FIGS. 1 and 2, in some implementations, a vehicle driving system 100 includes a tow vehicle 102 hitched to a trailer 104 by way of a hitch 106. The tow vehicle 102 may be but is not limited to a car, a crossover, a truck, a van, a sports-utility-vehicle (SUV), and a recreational vehicle (RV). The trailer 104 may be any type of trailer including, for example, a gooseneck trailer or a fifth wheel trailer. The tow vehicle 102 includes a drive system 110 associated with the tow vehicle 102 that maneuvers the tow vehicle 102 and thus the vehicle driving system 100 across a road or other surface based on drive maneuvers or commands having x, y, and z components, for example. As shown, the drive system 110 includes a front right wheel 112, 112a, a front left wheel 112, 112b, a rear right wheel 112, 112c, and a rear left wheel 112, 112d. In addition, the drive system 110 may include wheels (not shown) associated with the trailer 104. The drive system 110 may include other wheel configurations as well. The drive system 110 includes other components (not shown) that are in communication with and connected to the wheels 112 that allow the tow vehicle 102 to move, thus moving the trailer 104 as well. The drive system 110 may also include a brake system 114 that includes brakes associated with each wheel 112, 112a-d, where each brake 116 is associated with a wheel 112a-112d and is configured to slow down or stop the wheel 112a-112d from rotating. In some examples, the brake system 114 is connected to one or more brakes supported by the trailer 104. The drive system 110 may also include an acceleration system 113 that is configured to adjust a speed of the tow vehicle 102 and thus the vehicle driving system 100, and a steering system 115 that is configured to adjust a direction of the tow vehicle 102 and thus the vehicle driving system 100. The vehicle driving system 100 may include other systems as well.

The tow vehicle 102 may move across the road surface by various combinations of movements relative to three mutually perpendicular axes defined by the tow vehicle 102: a transverse axis $X_V$, a fore-aft axis $Y_V$, and a central vertical axis $Z_V$. The transverse axis $X_V$, extends between a right side R and a left side L of the tow vehicle 102. A forward drive direction along the fore-aft axis $Y_V$ is designated as $F_V$, also referred to as a forward motion. In addition, an aft or rearward drive direction along the fore-aft direction $Y_V$ is designated as $R_V$, also referred to as rearward motion. In some examples, the tow vehicle 102 includes a suspension system (not shown), which when adjusted causes the tow vehicle 102 to tilt about the $X_V$ axis and or the $Y_V$ axis, or move along the central vertical axis $Z_V$. As the tow vehicle 102 moves, the trailer 104 follows along a path of the tow vehicle 102. Therefore, when the tow vehicle 102 makes a turn as it moves in the forward direction $F_V$, the trailer 104 follows along.

Moreover, the trailer 104 follows the tow vehicle 102 across the road surface by various combinations of movements relative to three mutually perpendicular axes defined by the trailer 104: a trailer transverse (pitch) axis $X_T$, a trailer fore-aft (roll) axis $Y_T$, and a trailer central vertical (yaw) axis $Z_T$. The trailer transverse axis $X_T$, extends between a right side R and a left side L of the trailer 104, for example, along the trailer axle 105. A forward drive direction along the trailer fore-aft axis $Y_T$ is designated as $F_T$, also referred to as a forward motion. In addition, a trailer aft or rearward drive direction along the fore-aft direction $Y_T$ is designated as $R_T$, also referred to as rearward motion. Therefore, movement of the vehicle driving system 100 includes movement of the tow vehicle 102 along its transverse axis $X_V$, fore-aft axis $Y_V$, and central vertical axis $Z_V$, and movement of the trailer 104 along its trailer transverse axis $X_T$, trailer fore-aft axis $Y_T$, and trailer central vertical axis $Z_T$. Therefore, when the tow vehicle 102 makes a turn as it moves in the forward direction $F_V$, the trailer 104 follows along. While turning, the tow vehicle 102 and the trailer 104 form a trailer angle being an angle between the vehicle fore-aft axis $Y_V$ and the trailer fore-aft axis $Y_T$.

The tow vehicle 102 may include a user interface 120. The user interface 120 is configured to display information to the driver of the tow vehicle. In some examples, the user interface 120 is configured to receive one or more user commands from the driver via one or more input mechanisms and/or displays one or more notifications to the driver. In some examples, the one or more input mechanisms of the user interface 120 includes a touch screen display 122, a heads-up display, and various tow vehicle mirrors such as smart side mirrors and/or a rear view mirror that are configured for displaying information to the tow vehicle driver. In other examples, the one or more input mechanisms of the user interface 120 includes a rotary knob or a mouse to make a selection or otherwise provide information.

In the illustrated embodiment(s), the tow vehicle 102 includes a sensor system 130 to provide sensor system data 132 that may be used to determine one or more measurements associated with an environment of the tow vehicle 102, the trailer 104, and/or objects surrounding the tow vehicle 102. In some examples, the sensor system 130 provides for reliable and robust autonomous or semi-autonomous driving. The sensor system 130 may include different types of sensors that may be used separately or with one another to create a perception of the tow vehicle's environment or a portion thereof that is used by the vehicle driving system 100 to determine measurements and/or identify object(s) in its environment and/or in some examples autonomously drive and make intelligent decisions based on objects and obstacles detected using the sensor system 130. The tow vehicle 102 may support the sensor system 130 while in other examples, the sensor system 130 is supported by both the tow vehicle 102 and the trailer 104. The sensor system 130 may include sensor(s) positioned on the rear vehicle bumper 108 and/or on the front vehicle bumper.

In some implementations, the sensor system 130 includes one or more imaging devices 136, 136a-136c, such as cameras. The one or more cameras 136, 136a-136c capture images of an environment of the tow vehicle 102. The cameras 136 may be used in providing a surround view of the tow vehicle 102.

The sensor system 130 further includes one or more radar sensors 138a-138c. Radar sensors 138a-138c are mounted on the tow vehicle 102. In the illustrated embodiment, radar sensor 138a is mounted along a front end portion of the tow vehicle 102, and radar sensors 138b and 138c are disposed along a rear end portion of the tow vehicle 102, such as along the rear bumper thereof.

The sensor system 130 may include other sensors, such as sonar sensors, LIDAR (Light Detection and Ranging) sensors which can entail optical remote sensing that measures properties of scattered light to find range and/or other information of a distant target), LADAR (Laser Detection and Ranging) sensors, ultrasonic sensors, etc. The other sensors may be positioned on the tow vehicle 102, such as on a rear portion of the tow vehicle.

The sensor system 130 provides camera data 132 that includes camera image(s) captured by the camera 136a-136c, and radar data 137 captured by the radar sensors 138a-138c. Therefore, the sensor system 130 is especially useful for receiving information of the environment or portion of the environment of the vehicle 102 and for increasing safety in the vehicle driving system 100 which may operate by the driver, or under semi-autonomous or autonomous control.

The drive system 110, the user interface 120, and the sensor system 130 are in communication with a vehicle controller 140 that includes a computing device (or data processing hardware) 142 (e.g., central processing unit having one or more computing processors) in communication with non-transitory memory or hardware memory 144 (e.g., a hard disk, flash memory or other nonvolatile memory, random-access memory or other volatile memory) capable of storing software program code instructions executable on the computing processor(s)). In some examples, the non-transitory memory 144 stores program code instructions which when executed on the computing device 142 cause the vehicle controller 140 to provide signals or commands which control or facilitate the control of the tow vehicle 102 in a forward or reverse maneuver, either autonomously or semi-autonomously. Such instructions form at least part of a blind spot warning system 146 which are executed by the vehicle controller 140. As shown, the vehicle controller 140 is supported by the tow vehicle 102; however, the vehicle controller 140 may be separate from the tow vehicle 102 and in communication with the tow vehicle 102 via a network (not shown).

A blind spot zone is defined by the controller 140 for use by the blind spot warning system 146 such that a warning is provided to the tow vehicle driver in the event another vehicle is detected in the blind spot zone. The blind spot zone, depicted in FIG. 2 as a rectangle in two dimensions, is positioned adjacent the tow vehicle 102 and connected trailer 104. Specifically, a first blind spot zone 302A is depicted as extending in the forward direction to the location of the B-pillar of the tow vehicle 102 and in the rearward direction to a location beyond the rear of the tow vehicle 102. A second, extended blind spot zone 302B is depicted as extending in the forward direction to the location of the B-pillar of the tow vehicle 102 and in the rearward direction to a location beyond the rear of the trailer 104. A width of the blind spot zone may correspond to the width of a lane of a roadway. According to an example embodiment, the first blind spot zone 302A corresponds to the blind spot zone utilized by the blind spot warning system 146 when the tow vehicle 102 is used without the trailer 104 connected thereto, and the second blind spot zone 302B corresponds to the blind spot zone utilized by the blind spot warning system 146 when the tow vehicle 102 is operated with the trailer 104 connected thereto. The length of each blind spot zone 302A, 302B may be determined as described below using any number of techniques.

In an example embodiment, the blind spot warning system 146 determines whether the trailer 104 is connected to the tow vehicle 102. This determination may be automatically determined in any of a number of ways. For example, the blind spot warning system 146 may determine whether or not the trailer 104 is connected to the tow vehicle 102 based on sensor data from rearward-facing sensor 136a and/or sensor 138b, 138c using an object detection module or algorithm. In addition or in the alternative, the blind spot warning system 146 may determine whether or not the trailer 104 is connected to the tow vehicle 102 based on detection of an electrical connection of the lighting system of the trailer 104 to the electrical/lighting system of the tow vehicle 104 for powering and controlling the trailer's lighting system. The determination of whether or not the trailer 104 is connected to the tow vehicle 102 may also be made by the blind spot warning system 146 receiving, via the user interface 120, an indication from a user of the tow vehicle 102 that the trailer 104 is connected to the tow vehicle 102.

The blind spot warning system 146 may determine the size of the blind spot zone 302 for use in performing blind spot warning functions based in part upon the determination as to whether or not the trailer 104 is connected to the tow vehicle 102. In the event the trailer 104 is connected to the tow vehicle 102, the blind spot warning system 146 may determine the length of the blind spot zone 302 for use in performing blind spot warning functions based on the length of the trailer 104. The length of the trailer 104 may be provided by a user of the tow vehicle 102 via the user interface 120 or accessed from the memory 144.

Figure 4:
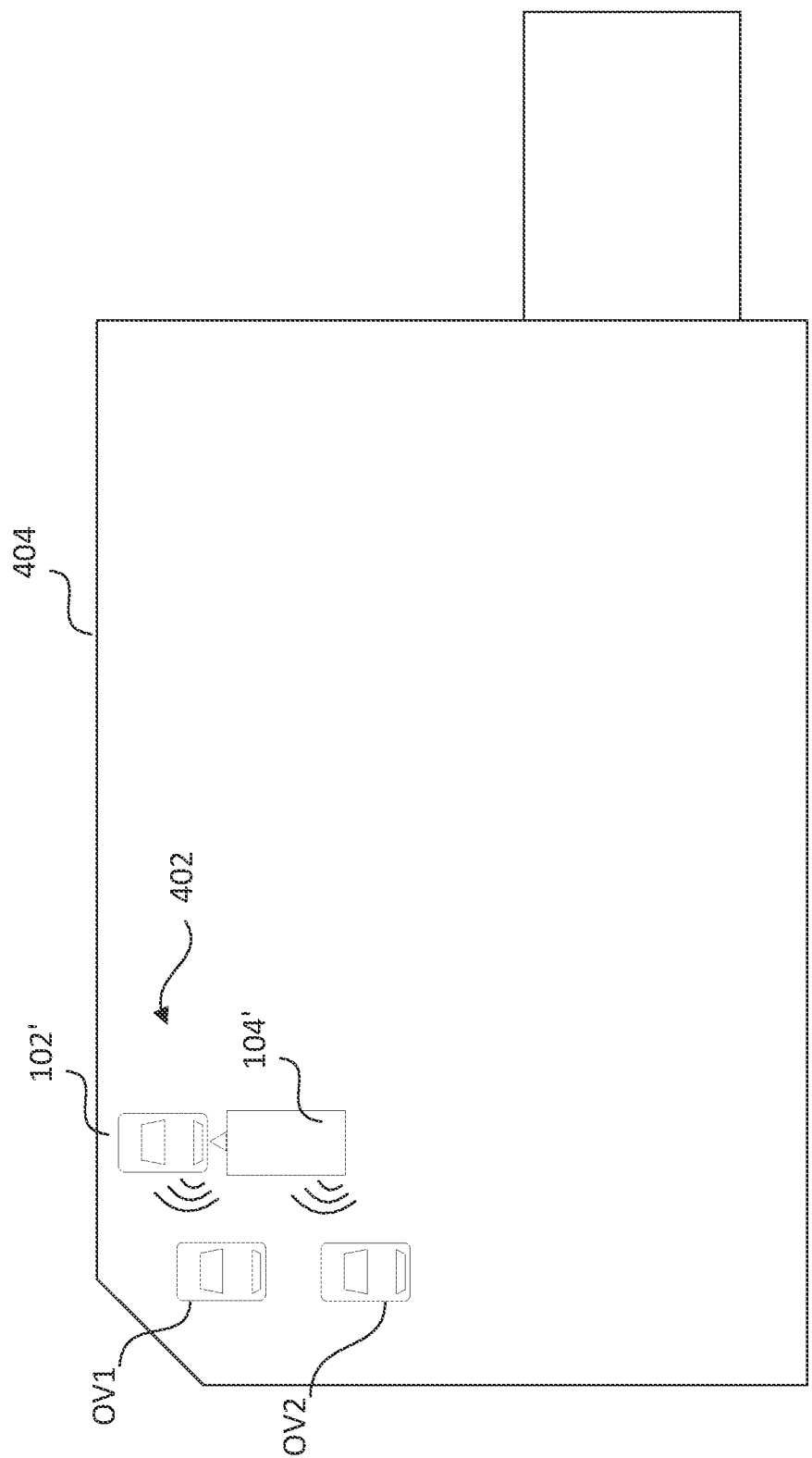
FIGS. 4-6 are elevational views of a side mirror of the tow vehicle of FIG. 1 having various blind spot images displayed thereon, according to an example embodiment.
Figure 5:
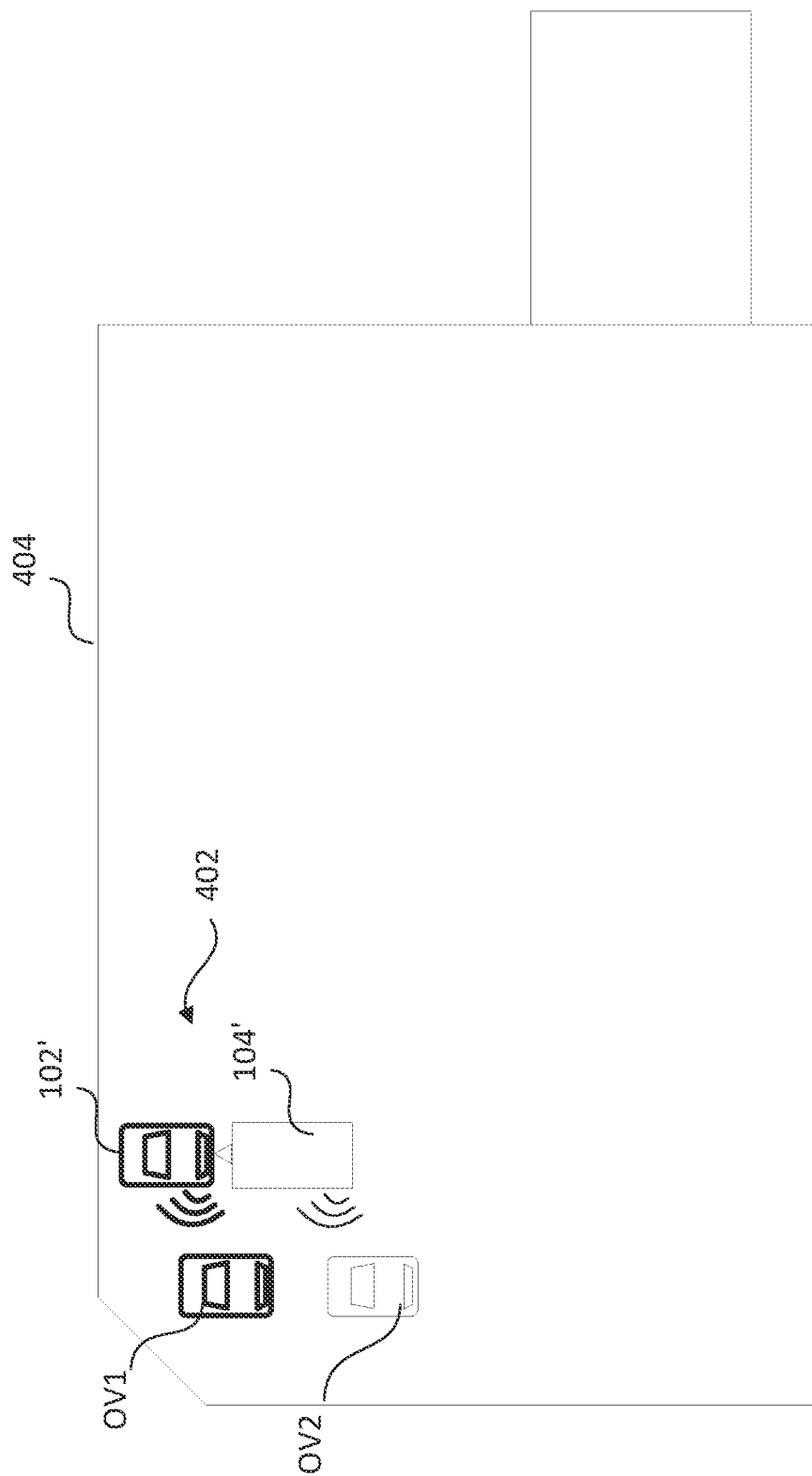
Figure 6:
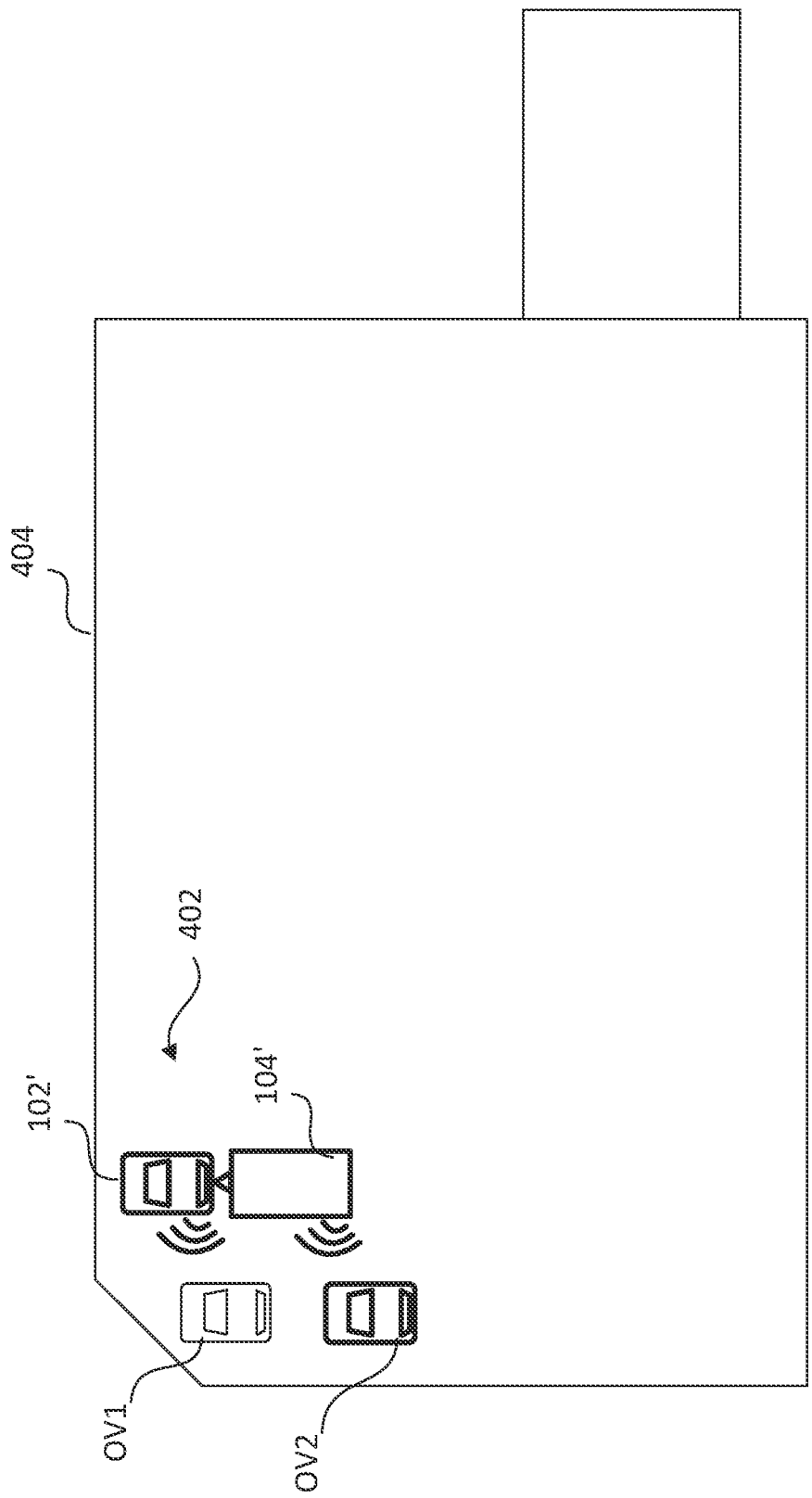

The blind spot warning system 146 further informs the driver of the tow vehicle 102 the blind spot zone 302A or 302B which is utilized by the blind spot warning system 146. According to an example embodiment, the blind spot warning system 146 displays an image to the driver of the tow vehicle 102 which informs the driver about the general length of the blind spot zone 302A or 302B so as to eliminate driver confusion as to the effectiveness of the operation of the blind spot warning system 146. FIGS. 4-6 shows an image 402 that is displayed within the view of the tow vehicle driver. In the drawings, the image 402 is displayed on a side mirror 404 of the tow vehicle, and in particular the left side mirror but it is understood the image may be displayed on the rear view mirror, a heads-up display and/or the touch screen display 122 of the tow vehicle 102. As shown in the drawings, the image 402 includes a representation 102' of the tow vehicle 102 and a representation 104' of the trailer 104 in a top plan view, along with a representation OV1 of a first other vehicle adjacent the representation 102' of the tow vehicle 102, and a second other vehicle OV2 adjacent the representation 104' of the trailer 104. FIG. 4 illustrates the displayed image 402 when the blind spot warning system 146 is activated but there are no vehicles detected in the blind spot zones of the tow vehicle 102 and/or the trailer 104. This image 402 may be displayed with or without the trailer 104 being connected to the tow vehicle 102.

The blind spot warning system 146 further informs the tow vehicle driver whether the blind spot zone corresponds to the tow vehicle 102 (i.e., zone 302A, when no trailer is connected thereto) or corresponds to the tow vehicle 102 and the trailer 104 (i.e., zone 302B, when the trailer is connected to the tow vehicle). In other words, the system informs the driver of the length or size of the blind spot zone 302A or 302B when a vehicle(s) is detected in the blind spot zone. FIG. 5 illustrates the display 402 when no trailer is connected to the tow vehicle 102 and another vehicle is detected in the blind spot zone 302A associated with the tow vehicle 102. In this drawing, the display of the image 402 changes such that the representation 102' of the tow vehicle 102 and the representation OV1 of the other vehicle adjacent the tow vehicle representation 102' change in appearance while the representation 104' of the trailer 104 and the other vehicle representation OV2 adjacent the trailer representation do not change. In one implementation, the color of the representation 102' of the tow vehicle 102 and the representation OV1 of the other vehicle changes. For example, the representations of the displayed image 402 may be a yellow when no vehicle is in the blind spot zone, and the representation 102' of the tow vehicle 102 and the other vehicle representation OV1 change to red responsive to the detection of another vehicle in the corresponding blind spot zone. FIG. 5 illustrates the representation 102' of the tow vehicle 102 and the representation OV1 of the other vehicle having changed in color (in this case, the widths of the lines depicting the representations are made larger to emulate a color change). By only changing the representation 102' of the tow vehicle 102 and the other vehicle representation OV1 not only indicates to the tow vehicle driver that another vehicle is in the blind spot zone but also that the blind spot zone 302A corresponding to the tow vehicle 102 is used by the blind spot warning system 146 due to the absence of the connected trailer 104. As a result, the tow vehicle driver is aware of the blind spot zone used by the blind spot warning system 146 so as to avoid confusion.

FIG. 6 illustrates the display 402 when the trailer 104 is connected to the tow vehicle 102 and another vehicle is detected in the blind spot zone 302B associated with the tow vehicle 102 and the trailer 104. In this drawing, the display of the image 402 changes such that the representation 102' of the tow vehicle 102, the representation 104' of the trailer 104 and the representation OV2 of the other vehicle adjacent the trailer representation 104' change in appearance. In one implementation, the color of these representations in the image 402 changes. For example, the representations of the displayed image 402 may be yellow when no vehicle is in the blind spot zone 302B and the representations of the tow vehicle 102, the trailer 104 and the other vehicle change to red responsive to the detection of another vehicle(s) in the corresponding blind spot zone 302B. FIG. 6 illustrates the representations of the tow vehicle 102, the trailer 104 and the other vehicle(s) having changed in color, relative to the representations in the displayed image 402 of FIG. 4. By changing the representation 102' of the tow vehicle 102, the representation 104' of the trailer 104 and the representation OV2 of the other vehicle not only indicates to the tow vehicle driver that another vehicle is in the blind spot zone but that the blind spot zone 302B corresponding to the tow vehicle 102 and the trailer 104 is used by the blind spot warning system 146 due to the presence of the connected trailer 104. As a result, the tow vehicle driver is aware of the blind spot zone used by the blind spot warning system 146.

Figure 7:
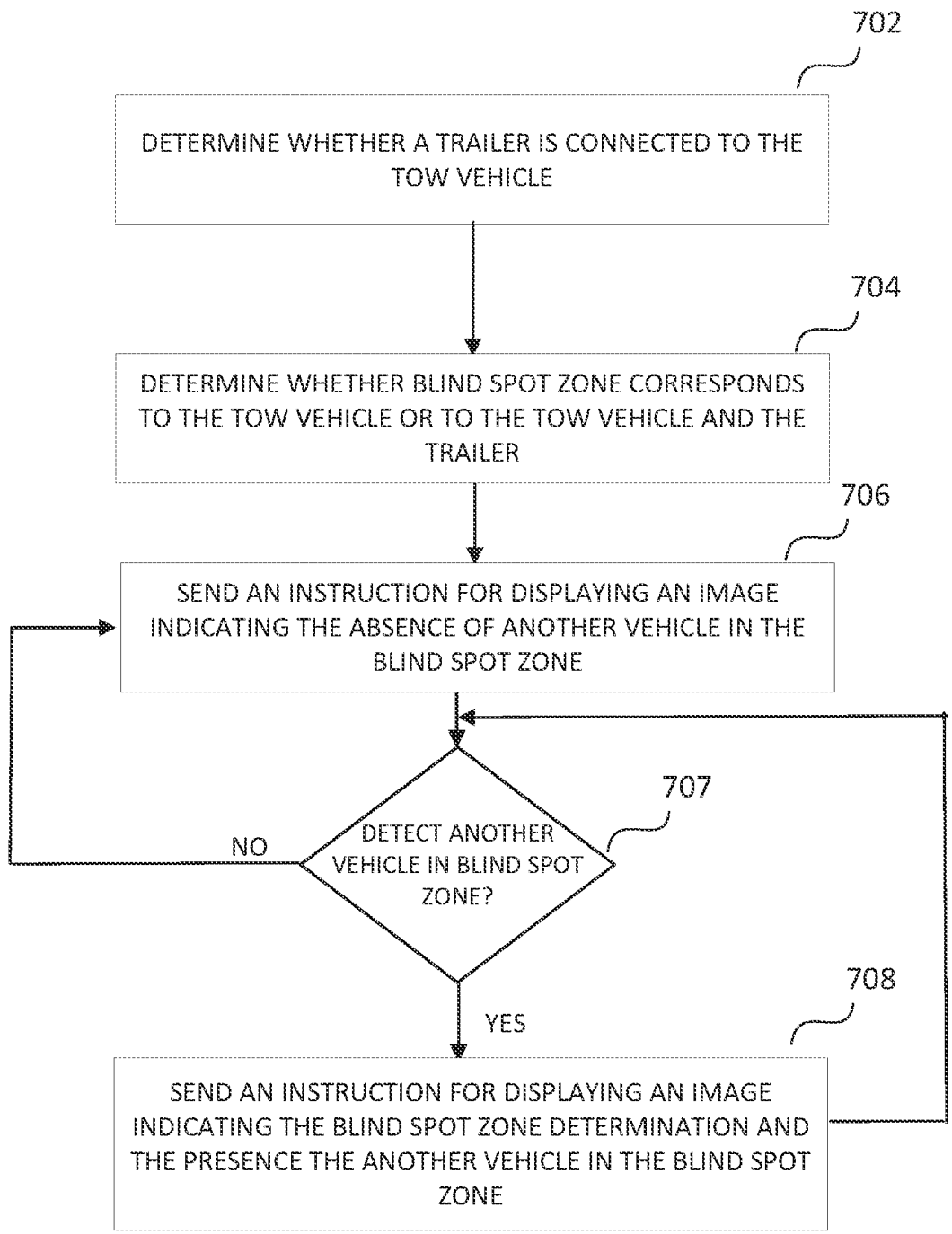
FIG. 7 is a flow chart illustrating an operation of the blind spot warning system of FIG. 2 according to an example embodiment.

FIG. 7 illustrates a flowchart of an operation of the blind spot warning system 146 according to an example embodiment. Following activation of the blind spot warning system 146, the controller 140, when executing instructions of the algorithm of the system, determines at 702 whether or not a trailer, such as the trailer 104, is connected or hitched to the tow vehicle 102. This determination may be automatically performed, such as by detecting the presence or absence of the trailer 104 in the sensor data provided by rear-facing sensors 136 and/or 138 of the tow vehicle 102, or by detecting the presence or absence of an electrical connection of the lighting system of the trailer 104 to the electrical/lighting system of the tow vehicle 102. Alternatively, the determination may be performed by a user of the tow vehicle 102 sending via the interface 120 a confirmation that the trailer 104 is connected to the tow vehicle 102.

Upon determining whether or not the trailer 104 is connected to the tow vehicle 102, the controller 140 determines at 704 whether the blind spot zone corresponds to the tow vehicle 102 or to both the tow vehicle 102 and the trailer 104. This determination is based on whether the trailer 104 is determined to be connected to the tow vehicle 102 in block 702. The trailer 104 being connected to the tow vehicle 102 results in the blind spot zone corresponding to both the tow vehicle 102 and the trailer 104, and the tow vehicle 102 being unconnected to the trailer 104 results in the blind spot zone corresponding to the tow vehicle 102.

The controller 140 may also determine the size or length of the blind spot zone for use in detecting another vehicle in the zone. The blind spot zone size or length may be determined based on various dimensions of the tow vehicle 102 and the connected trailer 104, which may be provided by the tow vehicle user via the user interface 120, accessed from the memory 144, and/or provided by analysis of the sensor data from the rear-facing sensors 136a, 138b, and/or 138c. The determined size or length of the blind spot zone may then be used to detect another vehicle disposed in the zone and warn the driver accordingly.

During operation, when the blind spot warning system 146 detects no vehicle in the blind spot zone, at 706 the controller 140 sends an instruction(s) to display the image 402 in a first color, such as yellow. In one implementation, the controller 140 sends the instruction(s) to the user interface 130 for displaying the image 402 on at least one mirror and/or other display of the tow vehicle 102.

When the system detects at 707 another vehicle in the blind spot zone, the controller sends at 708 at least one instruction for displaying the image 402 indicating the presence of the other vehicle in the zone and also indicating that the zone determined in block 704. In the event no trailer is connected to the tow vehicle 102, the displayed image 402 indicates the first blind spot zone 302A is used by changing the color of the representation 102' of the tow vehicle 102 and the representation OV of the other vehicle detected, as shown in FIG. 5. In the event the trailer 104 is connected to the tow vehicle 102, the displayed image 402 indicates that the second blind spot zone 302B is used by changing the color of the representation 102' of the tow vehicle 102, the representation 104' of the trailer 104, and the representation OV of the other vehicle(s), as shown in FIG. 6. Control then returns to block 707. Responsive to the detection of the other vehicle no longer being in the blind spot zone, the controller 140 at 706 sends an instruction for displaying the image 402 which indicates the absence of the other vehicle in the zone by returning the representations in the displayed image 402 to the original yellow color.

In another example embodiment, a static notification is constantly provided to the vehicle driver as to the size of the blind spot zone 302A or 302B. In one implementation, additional text may be included in the image 402 indicating that a trailer is connected to the tow vehicle 102. In another implementation, the representation 102' of the tow vehicle 102 is constantly displayed in red when no trailer is connected to the tow vehicle, and the representation 102' of the tow vehicle 102 and the representation 104' of the trailer 104 are constantly displayed in red when a trailer 104 is connected to the tow vehicle. Then, when another vehicle is detected in the corresponding blind spot zone 302A or 302B, only the representation OV1 or OV2, respectively, changes color to red to alert the vehicle driver of the presence of another vehicle in the corresponding blind spot zone. In another implementation, the representation 104' of the trailer 104 and the representation OV2 of the other vehicle are separated from the representations 102' and OV1 of the tow vehicle 102 and the other vehicle, respectively, wherein the representations 104' and OV2 or a text representing extended blind spot zone 302B is illuminated while other vehicle detections in the blind spot zone 302B are active.

Moreover, the software instructions which are executed by the controller 140 to perform blind spot warning functions may be saved in the memory 144 or other computer readable medium. The disclosed memory device 44, may can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM etc.). The software in the memory may include one or more separate programs, each of which includes an ordered listing of executable instructions for implementing logical functions. The controller 40 can be configured to execute software stored within the memory, to communicate data to and from the memory, and to generally control operations of the computing device pursuant to the software. Software in memory, in whole or in part, is read by the processor, perhaps buffered within the processor, and then executed.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A blind spot warning method for a tow vehicle, the method comprising:
   determining, at data processing hardware, whether a trailer is connected to the tow vehicle;
   determining, at the data processing hardware based on the determination whether the trailer is connected to the tow vehicle, whether a blind spot zone corresponds to the tow vehicle or to the tow vehicle and the trailer;
   sending, from the data processing hardware to a user interface of the tow vehicle, at least one instruction for displaying a first image for viewing by a driver of the tow vehicle;
   wherein the displayed first image comprises a graphic representation of the tow vehicle, a graphic representation of the trailer, a graphic representation of a first other vehicle disposed adjacent the graphic representation of the tow vehicle, and a graphic representation of a second other vehicle disposed adjacent the graphic representation of this trailer, this displayed first image corresponding to there being no vehicle detected in this blind spot zone;
   detecting, at the data processing hardware, another vehicle in the bland spot zone;
   if the trailer is determined to be connected to the tow vehicle, sending at lent one second instruction from the data processing hardware to the user interface to change in the displayed first image the graphic representation of the tow vehicle, the graphic representation of the trailer and the graphic representation of the second other vehicle without changing in the displayed first image the graphic representation of the first other vehicle, the sending being responsive to the detection of the another vehicle in the blind spot zone, rind the change in the graphic representations indicating that the trailer is connected to the tow vehicle and the another vehicle is in the blind spot zone corresponding to the tow vehicle and the trailer; and
   if the trailer is determined not to be connected to the tow vehicle, sending at least one third instruction from the data processing hardware to the user interface to change in the displayed first image the graphic representation of the tow vehicle and the graphic representation of the first other vehicle without changing in the displayed first image the graphic representation of the trailer and the graphic representation of the second other vehicle, the sending being responsive to the detection of the another vehicle in the blind spot zone, and the change in the graphic representations of the tow vehicle and of the first other vehicle indicating that the trailer is not connected to the tow vehicle and the another vehicle is in the blind spot corresponding to the tow vehicle.

2. The blind spot warning method of claim 1, wherein displaying the image comprises displaying the image on at least one mirror of the tow vehicle.

3. The blind spot warning method of claim 1, wherein displaying the image comprises displaying the image on a display of the tow vehicle.

4. The blind spot warning method of claim 1, wherein
the at least one second instruction to change the representation of the tow vehicle, the representation of the trailer, and the representation of the second other vehicle in the displayed first image is to change the representation of the tow vehicle, the representation of the trailer, and the representation of the second other vehicle from a first color to a second color, and
the at least one third instruction to change the representation of the tow vehicle and the trailer and the representation of the first other vehicle in the displayed first image is to change the representation of the tow vehicle and the representation of the first other vehicle from the first color to the second color without changing a color of the representation of the trailer.

5. The blind spot warning method of claim 4, wherein the second color is red.

6. The blind spot warning method of claim 1, further comprising receiving, at the data processing hardware, information associated with one or more dimensions of the trailer, and determining, at the data processing hardware, a length of the blind spot zone based at least partly upon the information, wherein if the trailer is determined to be connected to the tow vehicle, detecting the another vehicle in the blind spot zone is based upon the length of the blind spot zone.

7. The blind spot warning method of claim 1, wherein the determination whether the blind spot zone corresponds to the tow vehicle or to the tow vehicle and the trailer is constantly provided in the displayed image during operation of the tow vehicle.

8. A blind spot warning software product stored in non-transitory memory and having instructions which, when executed by data processing hardware causes the data processing hardware to perform a method comprising:
determining, by the data processing hardware, whether a trailer is connected to a tow vehicle;
determining, by the data processing hardware based on the determination whether the trailer is connected to the tow vehicle, whether a blind spot zone corresponds to the tow vehicle or to the tow vehicle and the trailer;
sending, by the data processing hardware, to a user interface of the tow vehicle, at least one instruction for displaying a first image for viewing by a driver of the tow vehicle,
wherein the displayed first image comprises a graphic representation of the tow vehicle, a graphic representation of the trailer, a graphic representation of a first other vehicle disposed adjacent the graphic representation of the tow vehicle, and a graphic representation of a second other vehicle disposed adjacent the graphic representation of this trailer, this displayed first image corresponding to there being no vehicle detected in this blind spot zone;
detecting, at the data processing hardware, another vehicle in the bland spot zone;
if the trailer is determined to be connected to the tow vehicle, sending at lent one second instruction from the data processing hardware to the user interface to change in the displayed first image the graphic representation of the tow vehicle, the graphic representation of the trailer and the graphic representation of the second other vehicle without changing in the displayed first image the graphic representation of the first other vehicle, the sending being responsive to the detection of the another vehicle in the blind spot zone, rind the change in the graphic representations indicating that the trailer is connected to the tow vehicle and the another vehicle is in the blind spot zone corresponding to the tow vehicle and the trailer; and
if the trailer is determined not to be connected to the tow vehicle, sending at least one third instruction from the data processing hardware to the user interface to change in the displayed first image the graphic representation of the tow vehicle and the graphic representation of the first other vehicle without changing in the displayed first image the graphic representation of the trailer and the graphic representation of the second other vehicle, the sending being responsive to the detection of the another vehicle in the blind spot zone, and the change in the graphic representations of the tow vehicle and of the first other vehicle indicating that the trailer is not connected to the tow vehicle and the another vehicle is in the blind spot corresponding to the tow vehicle.

9. The blind spot warning software product of claim 8, wherein displaying the image comprises displaying the image on at least one mirror of the tow vehicle.

10. The blind spot warning software product of claim 9, wherein the at least one mirror comprises a side mirror of the tow vehicle.

11. The blind spot warning software product of claim 8, wherein
the at least one second instruction to change the graphic representation of the tow vehicle, the graphic representation of the trailer and the graphic representation of the second other vehicle in the displayed image is to change the graphic representation of the tow vehicle, the graphic representation of the trailer and the graphic representation of the second other vehicle from a first color to a second color, and
the at least one third instruction to change the graphic representation of the tow vehicle and the graphic representation of the first other vehicle in the displayed image is to change the graphic representation of the tow vehicle and the graphic representation of the first other vehicle from the first color to the second color.

12. The blind spot warning software product of claim 8, wherein the method further comprises receiving, by the data processing hardaware, data associated with one or more dimensions of the trailer, and determining, by the data processing hardware, the size of the blind spot zone is based at least partly upon the received data, wherein the data associated with the one or more dimensions of the trailer is provided from memory accessible by the data processing hardware or via a user interface of the tow vehicle.

13. A blind spot warning system for a tow vehicle, comprising:
a controller comprising data processing hardware and memory, the controller configured to
determine, by the data processing hardware, whether a trailer is connected to the tow vehicle;
determine, by the data processing hardware based on the determination whether the trailer is connected to the tow vehicle, whether a blind spot zone corresponds to the tow vehicle or to the tow vehicle and the trailer; and
send, by the data processing hardware, to a user interface of the tow vehicle, at least one instruction for displaying a first image for viewing by a driver of the tow vehicle;
wherein the displayed first image comprises a graphic representation of the tow vehicle, a graphic representation of the trailer, a graphic representation of a first other vehicle disposed adjacent the graphic representation of the tow vehicle, and a graphic representation of a second other vehicle disposed adjacent the graphic representation of this trailer, this displayed first image corresponding to there being no vehicle detected in this blind spot zone;

detect, at the data processing hardware, another vehicle in the bland spot zone;

if the trailer is determined to be connected to the tow vehicle, send at lent one second instruction from the data processing hardware to the user interface to change in the displayed first image the graphic representation of the tow vehicle, the graphic representation of the trailer and the graphic representation of the second other vehicle without changing in the displayed first image the graphic representation of the first other vehicle, the sending being responsive to the detection of the another vehicle in the blind spot zone, rind the change in the graphic representations indicating that the trailer is connected to the tow vehicle and the another vehicle is in the blind spot zone corresponding to the tow vehicle and the trailer; and if the trailer is determined not to be connected to the tow vehicle, send at least one third instruction from the data processing hardware to the user interface to change in the displayed first image the graphic representation of the tow vehicle and the graphic representation of the first other vehicle without changing in the displayed first image the graphic representation of the trailer and the graphic representation of the second other vehicle, the sending being responsive to the detection of the another vehicle in the blind spot zone, and the change in the graphic representations of the tow vehicle and of the first other vehicle indicating that the trailer is not connected to the tow vehicle and the another vehicle is in the blind spot corresponding to the tow vehicle.

14. The blind spot warning method of claim 1, wherein the graphic representation of the tow vehicle, the graphic representation of the trailer, the graphic representation of the first other vehicle and the second other vehicle each is located in a fixed position in the displayed image.

15. The blind spot warning software product of claim 8, wherein the graphic representation of the tow vehicle, the graphic representation of the trailer, the graphic representation of the first vehicle and the graphic second vehicle are each located in a fixed position in the displayed image.

16. The blind spot warning system of claim 13, wherein the graphic representation of the tow vehicle, the graphic representation of the trailer, the graphic representation of the first vehicle and the graphic second vehicle are each located in a fixed position in the displayed image.

* * * * *